United States Patent [19]
Williams

[11] 4,320,580
[45] Mar. 23, 1982

[54] METHOD AND DEVICE FOR DETERMINING THE POSITION OF A CUTTING TOOL RELATIVE TO THE ROTATIONAL AXIS OF A SPINDLE-MOUNTED WORKPIECE

[75] Inventor: Richard R. Williams, Oak Ridge, Tenn.

[73] Assignee: The United States of America as represented by the United States Department of Energy, Washington, D.C.

[21] Appl. No.: 183,780

[22] Filed: Sep. 3, 1980

[51] Int. Cl.³ .............. B24B 17/00; B27G 23/00; B66C 1/02
[52] U.S. Cl. .............. 33/185 R; 33/174 Q; 33/178 R; 33/DIG. 2; 269/21
[58] Field of Search .......... 33/185 R, 179.5 C, 174 P, 33/174 Q, DIG. 2, 178 R, 178 E; 51/165.75, 235, 165.78; 269/21

[56] References Cited
U.S. PATENT DOCUMENTS

| 1,294,103 | 2/1919 | Hitchcock | 51/235 |
| 2,998,680 | 9/1961 | Lipkins | 51/235 |
| 3,358,375 | 12/1967 | Lutz | 33/185 R |
| 3,665,648 | 5/1972 | Yamanaka | 51/165.78 |
| 3,910,620 | 10/1975 | Sperry | 269/21 |
| 4,183,545 | 1/1980 | Daly | 51/235 |

Primary Examiner—Willis Little
Attorney, Agent, or Firm—Earl L. Larcher; Stephen D. Hamel; Richard G. Besha

[57] ABSTRACT

The present invention is directed to a method and device for determining the location of a cutting tool with respect to the rotational axis of a spindle-mounted workpiece. A vacuum cup supporting a machinable sacrifical pin is secured to the workpiece at a location where the pin will project along and encompass the rotational axis of the workpiece. The pin is then machined into a cylinder. The position of the surface of the cutting tool contacting the machine cylinder is spaced from the rotational aixs of the workpiece a distance equal to the radius of the cylinder.

4 Claims, 4 Drawing Figures

METHOD AND DEVICE FOR DETERMINING THE POSITION OF A CUTTING TOOL RELATIVE TO THE ROTATIONAL AXIS OF A SPINDLE-MOUNTED WORKPIECE

This invention was made as a result of a contract with the U.S. Department of Energy.

BACKGROUND OF THE INVENTION

Generally, the present invention relates to a method and device for determining the position of the cutting surface or tip of a cutting tool and, more particularly, to the determination of the position of the cutting tool tip relative to the axis of rotation of a spindle-mounted workpiece without requiring physical contact between the tool and the workpiece.

In the operation of an automated machine tool signals from a computer program or a computer tape are utilized to actuate the slides for displacing the cutting tool along a programmed path to effect the desired machining of the workpiece surface. The program contains commands which are precalculated on the basis that the cutting tip of the cutting tool is in an exact, or known, initial reference position. Therefore, before machining can begin in such automated machine tools, it must be established that the cutting tip of the tool is, in fact, in the reference position since the quality of the machining operation is dependent upon the accuracy of this initial reference position.

Previously, several techniques including the use of feeler gauges, capacitance gauges, spark gaps, and the like, have been used to determine the initial tool position. While such prior art techniques have been somewhat successful, there are certain problems associated with their use which effectively detract from their overall desirability in determining the tool position. For example, the extent the feeler gauge is pinched during the determination of the tool position cannot be readily ascertained so that some error may exist in the determination of the tool position. Also, with the capacitance gauges the particular tool geometry effects the operation of the gauge so as to require frequent recalibration of the gauge to assure accuracy. Other techniques, such as use of a non-contact spark-gap-type system for tool setting such as described in assignee's U.S. Pat. No. 3,524,130, are disadvantageous in some instances due to possible damage by the spark to sharp-pointed cutting tools, such as diamond tools and the like.

SUMMARY OF THE INVENTION

Accordingly, it is the primary aim or objective of the present invention to provide a relatively simple yet highly accurate noncontacting method and device for determining the location of the working tip or surface of a cutting tool with respect to the axis of rotation of a workpiece supporting spindle of a machine tool. The device utilized for achieving the objectives of the present invention comprises a concave body which is disposed in an abutting relationship with either the workpiece or the spindle at a location approximately centered on the axis of rotation of the spindle. Through the use of suitable sealing means, the cavity in the concave body is closed while in the abutting relationship so that the cavity can be evacuated through conduit means in registry with the cavity within the vacuum source for maintaining the concave body in the abutting relationship with a workpiece or the spindle during the rotation thereof. A machinable or sacrificial pin is carried by the concave body and projects along the plane encompassing the axis of rotation. A portion of this pin is adapted to be contacted by the cutting tool and machined into a cylinder. When this cylindrical surface is achieved, the radius of the machine cylinder is equal to the distance from the tip of the surface of the cutting tool at a point in contact with the cylinder to the axis of rotation of the spindle. Thus, with this position of the cutting tool noted, the exact location of the cutting tip with respect to the axis may be readily fed into the program for subsequent machining.

Other and further objects of the invention will be obvious upon an understanding of the illustrative embodiment and method about to be described or will be indicated in the appended claims, and various advantages not referred to herein will occur to one skilled in the art upon employment of the invention in practice. The position of the cutting tip along the Y axis, i.e., along a plane parallel to the axis of rotation of the spindle, is determined by another technique which is not part of the present invention.

A preferred embodiment of the invention has been chosen for the purpose of illustration and description. The preferred embodiment illustrated is not intended to be exhaustive or to limit the invention to the precise form disclosed. It is chosen and described in order to best explain the principles and method of the invention and their application in practical use to thereby enable others skilled in the art to best utilize the invention in various embodiments and modifications as are best adapted to the particular use contemplated. While the present invention is shown being utilized with a machine tool wherein the Y slide supports the X slide, it will appear clear that other conventional slide arrangements known in the art may be readily utilized with the device and method of the present invention.

DETAILED DESCRIPTION OF THE INVENTION

Figure 1:
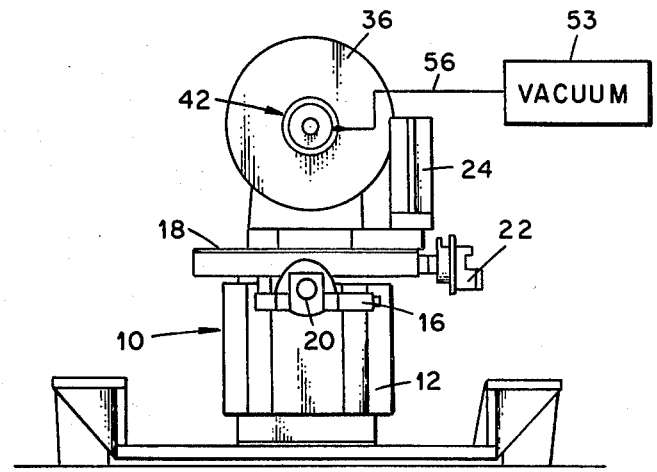
FIG. 1 is a front elevational view of a machine tool with the device of the present invention affixed to a spindle-mounted workpiece.
Figure 2:
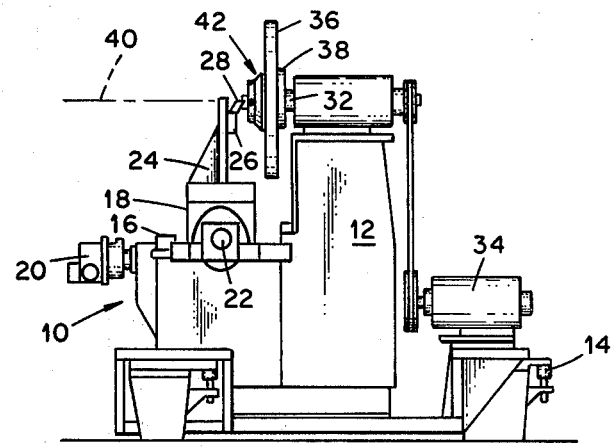
FIG. 2 is a side elevational view of the FIG. 1 machine tool showing further details of the machine tool and the device of the present invention.

As briefly mentioned above, the present invention is directed to a method and apparatus for determining the position of the material removing tip or surface of a cutting tool with respect to the axis of rotation of a spindle or a spindle-mounted workpiece. As shown in FIGS. 1 and 2, a machine tool which may utilize the present invention is generally shown at 10 and comprises a supporting base 12 which, for precision-machining purposes, may be isolated from the floor by suitable vibration insulators as generally shown at 14. The base 12 supports a Y slide mechanism 16 which, in turn, supports the cross or X slide 18. Suitable slide drive systems for displacing the Y slide 16 and the X slide 18, respectively, are generally shown at 20 and 22. As typical of automated machine tools the slide drive systems 20 and 22 are operated in accordance with a preselected program for displacing the cutting tool and/or the workpiece to provide the desired surface on the workpiece. The X slide 18 is shown supporting a fixture 24 which has affixed thereto a tool holder 26. A cutting tool 28 is attached to the tool holder by a bolting arrangement or the like as conventionally practiced. As shown, the cutting tip or surface of the tool 28 used for the actual machining of the workpiece is at 30.

Figure 3:
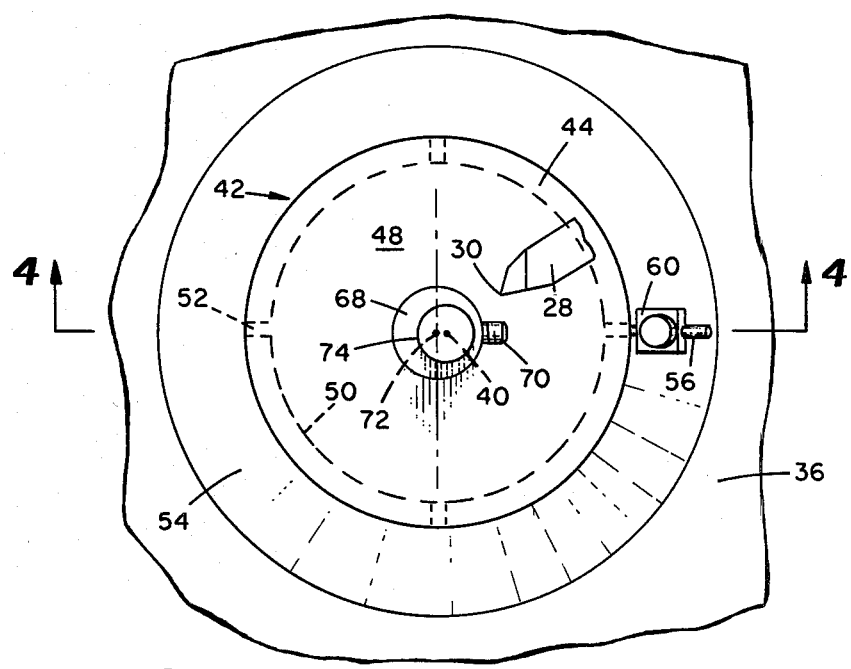
FIG. 3 is a front view of the device of the present invention as mounted on a workpiece with a portion of the sacrificial pin machined into a cylinder for showing the position of the cutting tool relative to the axis of rotation of the spindle-mounted workpiece.
Figure 4:
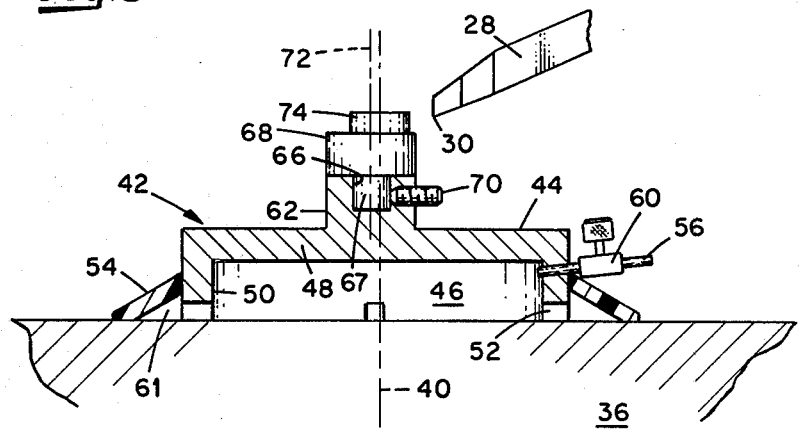
FIG. 4 is a sectional view taken generally along line 4—4 of FIG. 3 showing further details of the tool-positioning device of the present invention.

The machine tool 10 also includes a spindle 32 driven by a suitable drive mechanism 34. A workpiece 36 is rotatably supported on the spindle 32 by a chuck or face plate 38. The rotational axis of the spindle 32 and workpiece 36 is shown by the broken line 40 in FIGS. 2, 3, and 4.

The device of the present invention, as generally shown at 42, comprises a concave or cup-shaped body 44 in which a central cavity 46 is defined by a discoidal member 48 affixed to an annular flange 50. The distal end of the flange 50 is configured to uniformly bear against the workpiece 36 so as to provide adequate rigidity to the device during the machining aspect in the determination of the cutting tool position as briefly described above. A plurality of circumferentially spaced-apart slots 52 extend through the flange 50 to place the cavity 46 in registry with the exterior surface of the cup-shaped body. An annular flexible skirt 54 of neoprene, rubber, or the like, is attached to the cup-shaped body 44 and is of a length sufficient to contact and bear against the workpiece surface at a location spaced from the peripheral edges of the cup-shaped body 44 when the latter is placed against the workpiece 36. A conduit 56 extends through the flange 50 to place the cavity 46 in registry with a vacuum source 58. A suitable valve or stop cock 60 is shown on the conduit 56. With the cup-shaped body 44 held against the workpiece 36 the cavity 46 and the annular volume 61 defined by the flange 50, skirt 54 and workpiece 36 are evacuated via the conduit 56 and the vacuum source 58 to pull the skirt 54 and the flange 50 against the surface of the workpiece 36 and hold the cup-shaped body 44 against the workpiece 36. With the cavity 46 evacuated the stop cock 60 is closed and the section of conduit 58 extending between the stop cock 60 and the vacuum source 58 is disconnected at the stop cock 60 so that the device 42 may freely rotate with the workpiece 36 as the latter is rotated by the spindle 32.

The surface of the discoidal member 48 opposite the cavity 46 is provided with a centrally disposed projection or boss 62. The boss 62 is provided with a receptacle 66 in which the reduced-diameter end 67 of a sacrificial pin 68 is disposed and maintained therein by a set screw 70. The boss 62 may be removably attached to the discoidal member 48 by bolts or the like (not shown) to facilitate the placement of the sacrificial pin 68 in the receptacle 66. The pin 68 is of a relatively easy machinable material such as brass or aluminum and is of a cylindrical cross section of a diameter in the range of about ½ inch to 1 inch and a length of about ½ inch to 1 inch.

In the operation of the subject invention the workpiece 36 is mounted on the face plate or chuck 38 of the spindle. The device 42 of the present invention is placed at approximately the center of rotation of the workpiece 36 and then the cavity 46 and skirt volume 61 are evacuated so as to lock the device 42 to the surface of the workpiece with the sacrificial pin 68 encompassing and projecting along a center line such as shown by the broken line at 72 which is as near as practical to the rotational axis 40 of the workpiece 36. The machining of the pin 68 is initiated by advancing the cutting tool 28 to the surface of the pin 68. This machining of the pin continues until the machine portion 74 of the pin 68 is turned to a cylinder of a uniform diameter. At this point or during the entire course of the machining the precise X-axis position of the cutting tool tip 30 is recorded. The pin 68 is then removed from the boss receptacle 66 and the diameter of the machined cylindrical portion 74 is then precisely measured. With this measurement completed the position of the cutting tool tip 30 when in contact with the surface of the machined portion 74 is exactly one-half the diameter of the machined pin portion 74 from the axis of spindle rotation.

By using the device and method of the present invention the position of the cutting surface of the tool to the axis of rotation of the workpiece can be determined precisely without contacting the tool to the part being machined. By using the subject device the sacrificial pin can be held on a smooth rotating surface without the use of possible surface-damaging attaching mechanisms. Also, while the subject device is shown as being used with a relatively flat discoidal workpiece, it will appear clear that the subject invention may be suitably configured to be utilized on workpieces of various shapes, such as spherical, conical, and the like.

What is claimed is:

1. A device for determining the position of the cutting tool with respect to the axis of rotation of a workpiece-supporting spindle in a machine tool, said device comprising a concave body disposed at a location intersected by said axis in an abutting relationship with a surface portion of one of said workpiece and said spindle and defining a cavity therewith, seal means attached to said body for closing said cavity while in said abutting relationship, conduit means in registry with said cavity and a source of vacuum for evacuating the cavity and maintaining the concave body in said abutting relationship, and a machinable pin means carried by said body and projecting along a plane encompassing said axis and adapted to be contacted and machined into a cylinder by said cutting tool with the radius of the machine cylinder being equal to the distance of the cutting surface of the tool in contact with said cylinder from said axis.

2. The device claimed in claim 1, wherein a boss means is carried by said body at a location intermediate said pin and said body, and wherein said pin means are removably secured to said boss means.

3. The device claimed in claim 1, wherein an annular flexible skirt means is disposed about and attached to the peripheral surface of said concave body and is adapted to bear against said surface portion when the concave body is in said abutting relationship, and wherein the evacuation of the cavity maintains said skirt means against said surface portion.

4. A method for determining the location of a cutting tool with respect to the axis of rotation of a spindle or a spindle-mounted workpiece of a machine tool comprising the steps of affixing a machinable member to one of said spindle and said workpiece at a location encompassing said axis,
turning a portion of said member to a uniform diameter, and
measuring the turned diameter of said member to establish the lateral location of the cutting edge of the tool with respect to the axis of rotation of the machine spindle or workpiece.

* * * * *